United States Patent [19]

Baum et al.

[11] Patent Number: 5,423,013
[45] Date of Patent: Jun. 6, 1995

[54] SYSTEM FOR ADDRESSING A VERY LARGE MEMORY WITH REAL OR VIRTUAL ADDRESSES USING ADDRESS MODE REGISTERS

[75] Inventors: Richard I. Baum, Poughkeepsie, N.Y.; Brent A. Carlson, Rochester, Minn.; Moon J. Kim, Fishkill, N.Y.; Michael G. Mall, Lagrangeville, N.Y.; Casper A. Scalzi, Poughkeepsie, N.Y.; Bhaskar Sinha, Wappingers Falls, N.Y.

[73] Assignee: International Business Machines Corporation, Armonk, N.Y.

[21] Appl. No.: 754,810

[22] Filed: Sep. 4, 1991

[51] Int. Cl.$^6$ .............. G06F 12/10; G06F 12/08; G06F 12/06
[52] U.S. Cl. .................. 395/400; 395/425; 364/DIG. 1
[58] Field of Search ......... 364/200 MS; 395/400, 395/425, 275

[56] References Cited

U.S. PATENT DOCUMENTS

| 3,657,705 | 4/1972 | Mekota, Jr. et al. | 395/375 |
|---|---|---|---|
| 4,355,355 | 10/1982 | Butwell et al. | 395/400 |
| 4,361,868 | 11/1982 | Kaplinsky | 395/400 |
| 4,564,903 | 2/1986 | Guyette et al. | 395/425 |
| 4,675,809 | 6/1987 | Omada et al. | 395/375 |
| 4,758,951 | 7/1988 | Sznyter, III | 395/400 |
| 4,825,358 | 4/1989 | Letwin | 395/700 |
| 4,868,740 | 9/1989 | Kagimasa et al. | 395/400 |
| 4,979,098 | 12/1990 | Baum et al. | 395/400 |
| 5,023,773 | 6/1991 | Baum et al. | 395/425 |

OTHER PUBLICATIONS

IBM Enterprise Systems Architecture/370: Principles of Operation; SA22-7200-0; Aug. 1988; pp. 2-1 to 2-6; 3-1 to 3-4; 3-11 to 3-38; 5-5 to 5-8, and 15-31 to 15-32.
IBM Technical Newsletter: SN22-5279; Apr. 17, 1989; pp. 3-5 to 3-10; 4-5 to 4-6; 5-27 to 5-30; 5-41 to 5-42, and 5-45 to 5-46.

*Primary Examiner*—Glenn Gossage
*Assistant Examiner*—Reginald G. Bragdon
*Attorney, Agent, or Firm*—Bernard M. Goldman

[57] ABSTRACT

Allows instructions and data to be located in any one or more of plural sections of a large-size real memory of a data processing system. Any memory section is located by concatenating a conventional small real/absolute address with an address extender used with conventional small-size memory. A Central Processor Extended Address Mode (CPEAM) register content indicates the location of extenders in an AR(s), ASTE(s), STE(s) or PTE(s) for use by a central processor or I/O operations. An Input-Output Extended Address Mode (IOEAM) register content indicates the location of the extenders in ORB(s), CCW(s) or IDAW(s) for use by I/O operations. A compatible mode sets the content to zero for either or both of the CPEAM and IOEAM if either or both is not to be used.

12 Claims, 10 Drawing Sheets

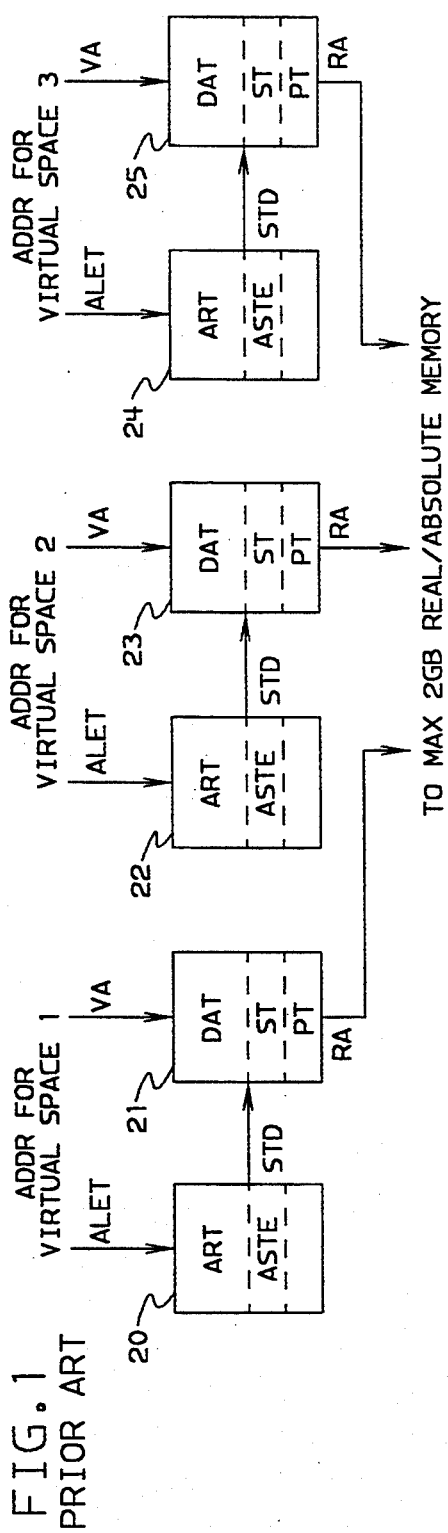
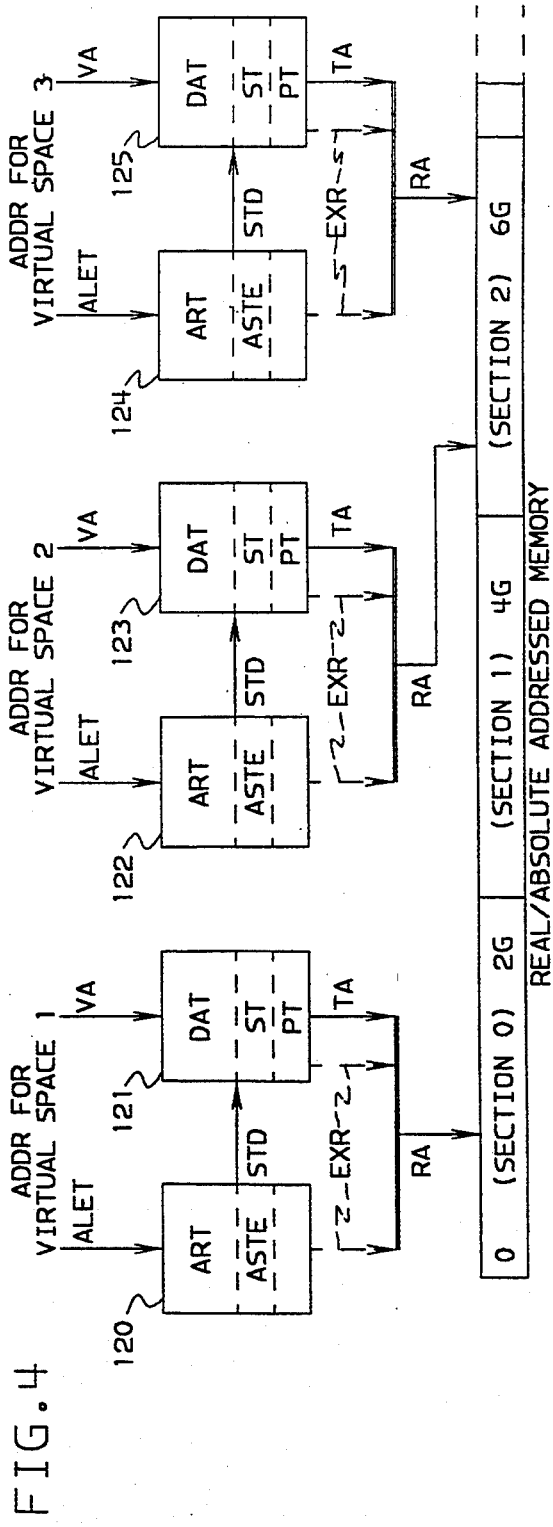
FIG. 1 PRIOR ART
FIG. 4

SYSTEM FOR ADDRESSING A VERY LARGE MEMORY WITH REAL OR VIRTUAL ADDRESSES USING ADDRESS MODE REGISTERS

The invention provides extended addressing for small addresses obtained for instructions, for operands, and for some control tables in central processor and I/O programs to enable the small addresses to operate with a very large memory. The invention also controls how the extended addresses are mapped into the same or different sections of the memory.

The invention may be used with instructions and operands using conventional logical addressing (such as the conventional 31 or 24 bit real or virtual addresses) to generate addresses for a very large memory. A very large memory is defined herein as a memory having a size exceeding 2**31 data units which cannot all be addressed by 31 bit addresses. With this invention, a very large memory may be millions of times greater than the prior maximum memory size of 2 GigaBytes, and yet allow addressing by programs using 31 bit (or 24 bit) addresses. For example, the invention can generate real/absolute addresses having 63 bit size, while using the current type of 32 bit address arithmetic circuits.

BACKGROUND

The trend is for memories in computer systems to continue increasing in size to accommodate more and larger programs and data bases.

Current computer systems commonly execute programmed instructions having real or virtual addresses with a size of 32 bits or under, commonly 16, 20, 24 and 31 bits. When such virtual addresses are used, they are often translated to a real or absolute address having a 32 bit size or less. An absolute address is a real address which has been prefixed to enable multiple processors to share the same memory.

Extending the address size increases complications in a computer's addressing system. Some techniques add more complications than other techniques. One complication is to maintain downward programming compatibility after extending the address. Examples of prior patents attempting to increase address size are U.S. Pat. No. 4,675,809 to Omada et al U.S. Pat. No. 4,825,358 to Letwin and U.S. Pat. No. 4,868,740 to Kagimasa et al. None of these prior patents discloses the address-extension method of the subject invention for enabling the use of very large system memories by providing unique ways of generating real address extenders.

SUMMARY OF THE INVENTION

The subject invention enables extended real/absolute addressing to be generated in a computer system while maintaining downward compatibility with the prior smaller size addresses generated in old programs. The invention allows the use of small-address arithmetic circuits of the type used in prior computers. Prior address extensions usually required a modification or expansion of the address arithmetic circuits to accommodate an increased address size, which is not required with the subject invention.

Further, the subject invention need not reduce the speed of address generation when generating extended real/absolute addresses for use in a very large memory.

The invention provides relatively simple ways to extend the address size for small real and absolute addresses to map them into a very large memory. For example, the real/absolute addresses currently-used in IBM ESA/390 and S/370 systems have a current-maximum 31 bit size which can byte address a maximum system memory size of 2 GigaBytes (2 GB=2**31 bytes). The invention enables a computer system to address any byte data-unit in a very large memory (greater than 2 GB), while executing programs generating 24 or 31 bit addresses. The prior 32 bit address arithmetic circuits for generating 24 or 31 bit addresses may also be used with the extended-address generation method and means of this invention.

The invention includes extended real-address generation utilizing many different conventional methods of generating small addresses. Included are small addresses generated directly from instructions and operands (using the DAT-OFF mode in the ESA/390 architecture), or generated indirectly from address translation (using DAT-ON mode in the ESA/390 architecture). The ESA/390 architecture is described in prior publications such as the "Enterprise Systems Architecture/390 Principles of Operation" having form number SA22-7201 for ordering it from the IBM Corporation, and its contents are incorporated into this specification by reference. Further, asynchronous programs, such as I/O programs (which are structured differently than central processor, CP, programs), must handle their address extensions differently than CP programs.

The invention uniquely provides one or more address extenders (EXRs) concatenated at the high-order end of a conventionally-generated real or absolute address of less than 32 bit size to provide a real/absolute address of greater than 31 bit size. An "absolute address" is a real address provided by any of plural processors sharing the same system memory after the real address is adjusted with a prefix value solely assigned to the respective processor (according to the ESA/390 architecture) to allow each processor to access only its assigned prefix page (and no other processor's prefix page), but not restricting the sharing by all processors of the remaining part (non-prefixed pages) in the memory.

"Concatenation" is the act of combining two different sets of bits, such as putting them side-by-side into a single register, or transferring them on contiguous sets of lines in a parallel bus, or transferring them in sequential time slots on a serial bus. The EXR is preferably provided to the concatenation process at the same time, or prior to, when the small address is provided from its address generation circuit.

Each EXR value defines a section of a very large memory and is a potential address of the memory section for mapping therein a small address. A "section" is the unit of a very large memory defined by the largest small address to be mapped in the very large memory. For example, each section in a very large memory for accommodating the mapping of small 31-bit byte addresses has a maximum size of 2**31 bytes, which is 2 GigaBytes per section in the very large memory.

When the invention is being used with a CP program operating in the DAT-OFF mode, an EXR for each operand data address is contained in a register associated with the base register being currently used for operand address generation (such as an access register, AR, defined in the ESA/390 architecture). Then the respective base register content, the operand D field, and any associated index register content are accessed and used in the small address generation. The EXR content of the associated AR is automatically concatenated to the high-order end of the generated small address to provide a required extended address for accessing a very large memory. Each of plural base registers may be associated with a different EXR to generate a different extended address which may access different sections of a very large memory. The EXR value may be changed in any EXR register to change the section of the memory to be accessed by the related base address.

The next CP instruction address in current processors is a small address, which must be extended if it is to be able to address any section in a very large memory. The instruction address is a logical address that may or may not require address translation according to whether the DAT-ON or DAT-OFF mode exists in the processor. For the small instruction addresses in DAT-OFF mode, an EXR may be stored in an EXR field uniquely provided in a control register (CR) field or in the current PSW (program status word), and concatenated therefrom. Small instruction addresses in the DAT-ON mode may concatenate an EXR stored in a CR field, or in the current PSW, or in the program-called ASTE (address space table entry), and concatenated therefrom. If no EXR is specified for instruction accessing, then all instruction are accessed in only the first section of a very large memory, as is done in a compatibility mode for data accessing.

The use of access register (AR) hardware in the DAT-OFF mode is novel to this invention. ARs previously had no use in DAT-OFF mode, with their only use being in DAT-ON mode in the ESA/390 architecture. The AR hardware, itself, cannot be used for real address extension in DAT-ON mode, because it is then being used for its previously-defined AR function of selecting virtual address spaces.

In the DAT-ON mode, this invention provides several different ways for obtaining the EXR for a CP address, which have different mapping characteristics to the sections of a very large memory. These different ways are all involved with using an EXR field associated with an entity used in conventional address translation. For example, an EXR field may be associated with the ASTEs (ASN second table entries), or with the STEs (segment table entries), or with the PTEs (page table entries). The EXR read from the specified-entity is concatenated with the small real address generated by the address translation process which otherwise may be conventional.

The novel EXR field in the ASTE, STE or PTE is not used in the address translation process, but it is only used for address extension. Thus the EXR field content is concatenated to the high-order end of a conventionally-translated small virtual address. By not affecting the translation process, the invention maintains downward compatibility for programs providing conventional small (e.g. 31 bit) translated real addresses by converting them into greater than 31 bit addresses that can access any location in a very large memory. The EXR field may have a 17 bit size in an ASTE, STE, PTE or AR for the generation of 48 bit real/absolute addresses. Or the EXR field may have a 32 bit size in an ASTE, STE, PTE or AR for the generation of 63 bit real/absolute addresses.

In the DAT-ON mode, the invention enables varying degrees of flexibility in section selection for mapping the page frames containing the translated addresses in the very large memory. The flexibility allows all translated addresses of a specific address space to be mapped only in the first section, or in a single section anywhere, or in plural sections including from two sections up to all sections of the very large memory.

In a compatibility mode, all translated addresses are mapped only in the first memory section.

In an ASTE mode, EXR fields are respectively located in the ASTE entries, all translated addresses in the virtual address space described by the ASTE may be mapped in any single memory section.

In an STE mode, EXR fields are respectively located in the STE entries. Translated addresses may be mapped in any one or plural memory sections. But all page frames accessed through any STE are located in the same 2 GB section (defined by the EXR in the STE), and these page frames are located in that section at whatever PFRA values exist in the PTEs used in the translation process to probably non-contiguously locate those page frames in the section. That is, all translated addresses having a virtual address in the same virtual segment (1 MegaByte of contiguous virtual pages use the same STE) will map into the same memory section (defined by the EXR in its STE). Thus it can be seen that although this mode allows page mapping into plural memory sections, this mapping constrains the location of pages in the same virtual segment to the same section, which may not be important is some cases, but may be important in other cases.

In a PTE mode, EXR fields are respectively located in the PTE entries. Here, each translated page address is mapped into a unique page frame, which may be in any memory section in the very large memory. Hence, the PTE mode eliminates the segment constraint found with the STE mode, and provides total flexibility in the mapping of virtual addresses into a very large memory. Any subset (or all) of the pages can be mapped into the same memory section, or into any predetermined set of sections, by repeating the same EXR value for the PTEs used for a set of pages.

An extended address mode (EAM) field is provided by this invention in a control register (CR) field to indicate which mapping mode is being used by the processor's small addresses. For example, the EAM field may be set to zero to indicate extended addressing is not being used (such as where the system memory has not yet been configured to the very large size), but where the capability of extending the memory size is being retained by the system. Or the EAM field may be set to one of plural non-zero values to indicate in association with the DAT mode which type of EXR field is being used by the current program executing in the central processor, either in association with the ARs, PTEs, STEs or ASTEs.

The invention comprehends use of plural EXRs in the same address, such as using more than one of the types: ARs, ASTEs, STEs and PTEs. Plural EXRs may be concatenated to increase the accessible size of a very large memory. However, the concatenation of plural EXRs with a conventional small real/absolute address causes greater addressing complexity in a system than does the concatenation of a single EXR. The EAM mode field must then indicate the plural EAM types being used. Accordingly, the concatenation of plural types of EXRs enables the use of a much larger system memory than the concatenation of only one type of EXR.

This invention also applies to extending the data addresses for input/output (I/O) device programs operating with a very large memory. I/O data addressing is commonly done by programs executing in I/O channels and subchannels in a computer system. I/O extended addressing uses a different EAM field (an I/O EAM located in an I/O control block) to control flexibility in selecting one or more memory sections. The separate I/O EAM control allows I/O data to be independently mapped into a very large memory and to be accessed asynchronously with CP data mapped into the same memory.

I/O data transfer in an ESA/390 system is controlled by an ESA/390 start subchannel (SSCH) instruction. The I/O EAM control field may be provided in an otherwise conventional ORB (operation request block) addressed by an ESA/390 start subchannel (SSCH) instruction, which addresses the start of an associated I/O data control program.

If all I/O data, I/O programs and I/O control blocks controlled by the same SSCH instruction are to be mapped into the same section of the very large memory being used by the CP issuing the SSCH instruction, the current CP EXR may also be used as the I/O EXR for extending all I/O data addresses. In this case, the CP EXR is the only EXR used, and it is high-order concatenated with all addresses generated including both CP and I/O data addresses.

If it is required to be able to map the I/O data into a memory section different from the section addressed with the CP EXR, the separate I/O EXR field (in an I/O program control block, such as in the ORB) is enabled for use in generating extended I/O data addresses. Then the I/O EXR value in this field is used for the concatenation with the small data addresses obtained from the I/O program to provide I/O data mapping.

The CCWs comprising the I/O program and any IDAWs may be put into the CP data section of a very large memory, and the I/O data addressed by the CCWs and IDAWs may be put into one or more other sections of the memory. (Thus each address for accessing the ORB, CCWs and any IDAWs is extended with the current CP EXR, but each I/O data address within a CCW or IDAW is extended with the I/O EXR.)

Further, CCW and IDAW addressed data may be scattered into plural sections of a very large memory by associating an EXR field with each CCW or each IDAW. An IDAW EXR is concatenated with the conventional IDAW-contained small data address to extend the IDAW data address. And the blocks of data addressed by a sequence of CCWs or IDAWs may be put in different non-contiguous sections of the very large memory assigned for containing the I/O data.

In this manner, this invention can also map the I/O data of a single SSCH instruction into one or plural sections of a very large memory. The one section may be the same or different from the section addressed by the CP EXR.

Accordingly, many different types of CP EXRs and I/O EXRs have been described for generating extended addresses to support both processor and I/O extended addressing of a very large memory.

An EXR value can be initially loaded into any destination EXR field by setup instructions in a system control program. For example, conventional store instructions may be used to do this where the EXR field is in a field in system memory, such as in an ASTE, STE, PTE, ORB, CCW, IDAW, etc. The EXR fields in ARs may be loaded by a LAM (load access multiple) instruction that load the AR(s) with an EXR value(s) to be used for DAT-OFF PSW mode extended addressing.

DESCRIPTION OF THE DRAWINGS

FIG. 1 represents plural processors performing dynamic address translation (DAT) utilizing access register translation (ART) for enabling respective virtual addresses in independent address spaces to simultaneously access the same small real memory having a maximum of 2 GigaByte size for using 31 bit real addresses, as may be found in the prior-art.

FIG. 4 represents a modified ART/DAT process used in the described embodiment by a central processor for generating unique extended real addresses from virtual addresses.

DETAILED DESCRIPTION OF EMBODIMENTS OF THE INVENTION

General

Figure 2:
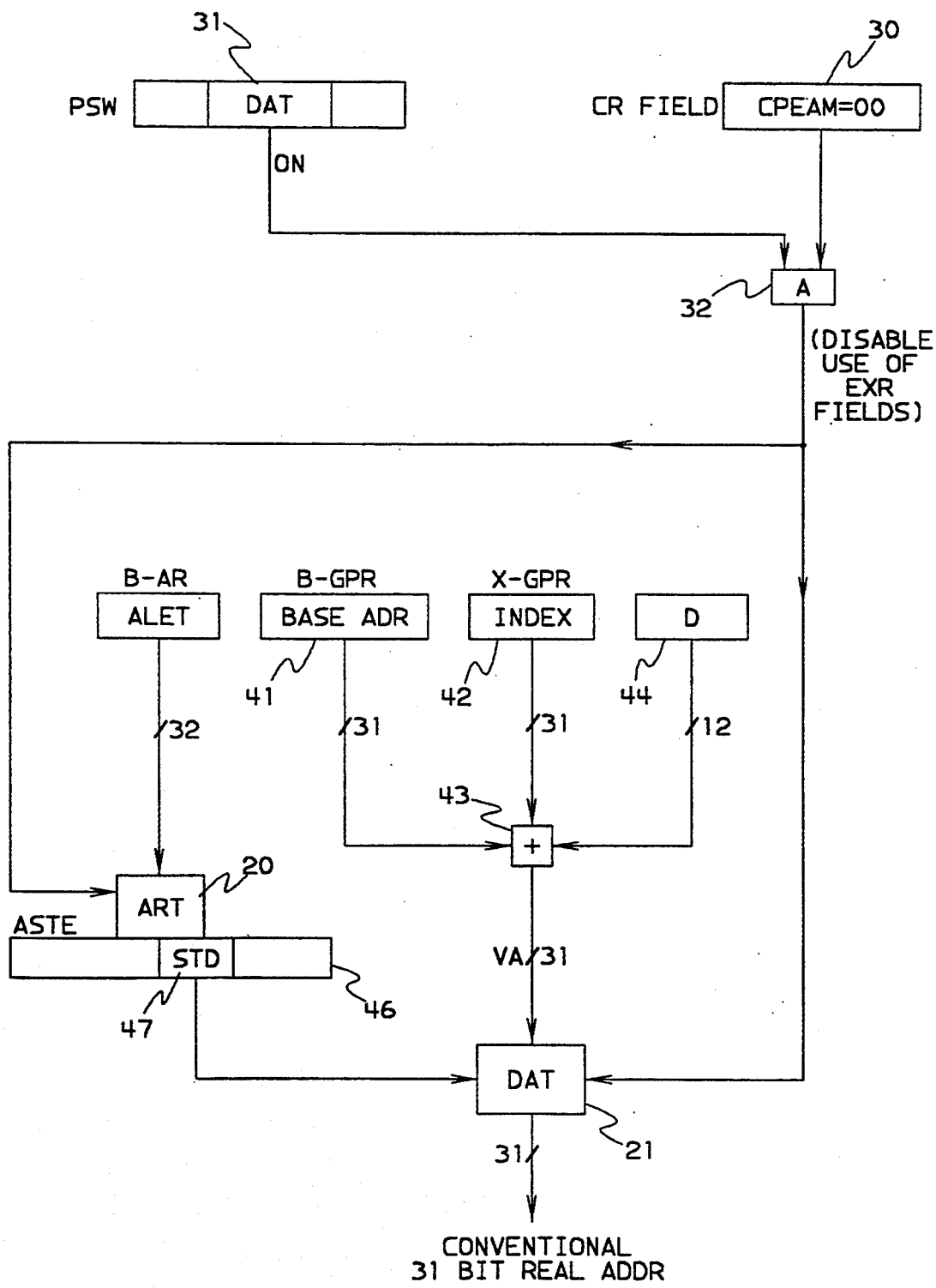
FIG. 2 represents a compatibility mode used by the described embodiment for enabling old programs using small logical addresses to access a very large memory requiring large real addresses.

The described embodiments of the invention enable programs using small addresses (which may be executable on currently available central processors (CP) and I/O processors) to access their data in a very large memory by extending the small addresses to large addresses required by the very large memory. The invention extends real (and absolute) addresses, whether or not the addresses are obtained by using address translation. Conventional programs using address translation (DAT-ON) can use a very large memory transparent to their code, since the address extension is applied automatically to the addresses for the program by modified ART/DAT hardware operations.

The described embodiments implement different modes of operation for central and I/O processors that differently extend a small address into a large address. A difference among some of the modes is in the way they differently map small addresses in a very large memory.

Among the choices in data mapping constraints provided by the various modes described herein for generating an extender of a small address are: 1. to restrict the small-addressed data to the first section in a very large memory that contains the program generating the small addresses. In the CP compatibility mode, all small addresses are mapped only into the first memory section. (This provides support for old versions of control programs which do not support extended addressing.); 2. to allow the small-addressed data within a given virtual address space to be located in any single section of very large memory, which may be the same or different from the section containing the program. Single section CP data mapping is done by the ASTE mode, and by the ORB mode for I/O data; and 3. to allow the small-addressed data of a given virtual address space to be located in a plurality of sections of a very large memory. Plural section mapping is done by the STE and PTE modes for CP data, and by the CCW and IDAW modes for I/O data. However, these modes have different mapping characteristics for the mapping of data in the plural sections.

FIG. 1 represents the compatibility mode for a CP, which allows the first section of a very large memory to be accessed by small real addresses of a CP without extending them. These small addresses may be provided from the address translation means in an IBM S/390, ESA/370 or S/370 system. Such addresses are provided by storage operands using the well-known B,X,D and B,D forms for generating a 31 bit effective logical address, which is a real address if the DAT-OFF mode exists in the processor's current PSW, or it is a virtual address if the DAT-ON mode is indicated in the processor's current PSW.

In FIG. 1, a system is shown having plural DAT (dynamic address translation) hardware 21, 23, 25 for the respective CP processors. Each CP is operating in DAT-ON mode, which enables translation of logical addresses in its executing programs. The different CPs are assumed to be accessing different virtual address spaces 1, 2 and 3. Each DAT operation does its address translation in the conventional manner: using the segment index part in a current logical address to access a segment table entry (STE) in an ST (segment table) to locate a PT (page table), and using the page index in the current address to access a page table entry (PTE) in the PT to obtain a PFRA (page frame real address) to locate the required page frame. The low order part (12 bits) of the current logical address is concatenated with the PFRA to generate the translated address, which is the real address resulting from the address translation. In a multiprocessor, this real address is prefixed in the conventional manner to provide an absolute address used for accessing the memory. In a uniprocessor, prefixing is optional, and it may or may not be done.

The address space for the DAT operation is determined by the choice of ST. In some systems, the ST is selected by the content of an access register (AR) associated with the base register selected by the B field in the current operand. In such case the content of the AR is an ALET (access list entry token) in the ESA/390 architecture which requires access register translation (ART).

The ART hardware 20, 22, 24 in FIG. 1 selects the respective STs defining the respective address spaces for the dynamic address translations. Each resulting real address generated by an address translation in FIG. 1 is a small 31 bit real address incapable of addressing a very large memory (which is defined herein as a memory having more than $2^{**}31$ bytes).

The described embodiments define a very large memory as having more than $2^{}31$ bytes, in the range between $2^{}31$ and $2^{}63$. A memory having $2^{}63$ bytes is 4,294,967,296 times larger than a memory having the prior maximum of $2^{**}31$ bytes.

The maximum size memory addressable by a 31 bit real address is a memory size up to, but not greater than $2^{}31$ data units, because a 31 bit address can only address $2^{}31$ data units in a memory. A small conventional 31 bit real address is generally incapable of addressing a very large memory.

Each CP in the described embodiment has a CPEAM (central processor extended address mode) field which may be located in a control register (CR) in the CP to support CP data accessing in a very large memory. The CPEAM field may be set to any of a plurality of states to control the way the sections of a very large memory are selected for the small CP addresses.

Also each I/O device uses an IOEAM (I/O extended address mode) field in an I/O control block in the device's subchannel to support the extending of small I/O data addresses for accessing a very large memory. The IOEAM field may be set to any of a plurality of states to control the way the sections of a very large memory are selected for the small I/O addresses.

The invention overcomes the small-address limitation (of addresses having 31 bits) by providing an address extender (EXR) concatenated at the high-order end of each small address. The EXR controls the selection of the section of the very large memory accessed by the small address. The respective EXR values have the effect of dividing a very large memory into respective sections, each section having $2^{**}31$ bytes.

Any address smaller than 31 bits can easily be made into a 31 bit address by putting zero padding bits above its highest-order bit position to provided a total of 31 bits for the padded address.

The CPEAM and IOEAM fields are set by system control programs for currently executing CP and I/O programs according to the type of section selection required for their execution in a very large memory.

Compatibility Mode for a Very Large Memory (FIG. 2)

FIG. 2 represents a compatibility mode for the described embodiment, which is indicated by a CPEAM field 30 being set to a zero value (CPEAM=00) during the existence of the DAT-ON mode. The compatibility mode indicates that small addresses (31 bit) are to be mapped into only the first section of a very large memory, and address extenders (EXRs) are not generated. An AND gate means 32 receives both the EAM=00 signal from CR field 30 and the DAT-ON signal from the PSW register 31 of the processor to output a compatibility mode signal. This signal is provided to DAT hardware 21 and to ART hardware 20 in FIG. 2 to disable the use of all EXR field(s) provided in the CP hardware. The result is that the DAT and ART hardware shown in FIG. 2 operates in their conventional manner to provide non-extended 31 bit real addresses to only the lowest-order section of a system's very large memory.

In FIG. 2 the conventional B and X address components of a current operand select a base general register 41 and an index general register 42, which have their contents provided to a hardware adder 43 along with the D field 44 of the current operand to conventionally generate an effective logical address which is provided to the DAT hardware 21. The content of any EXR field in the ASTE, STE and PTE (which are accessed during the DAT process), or in any other control block, are ignored during the CPEAM=00 state.

Thus, an ASTE (ASN second table entry) 46 is selected by the ART process to obtain an address (called a STO) that locates the ST required by the DAT process. The ASTE and its operation are defined by the ESA/390 architecture, which defines other fields in the ASTE related to accessing the respective address space.

Figure 3:
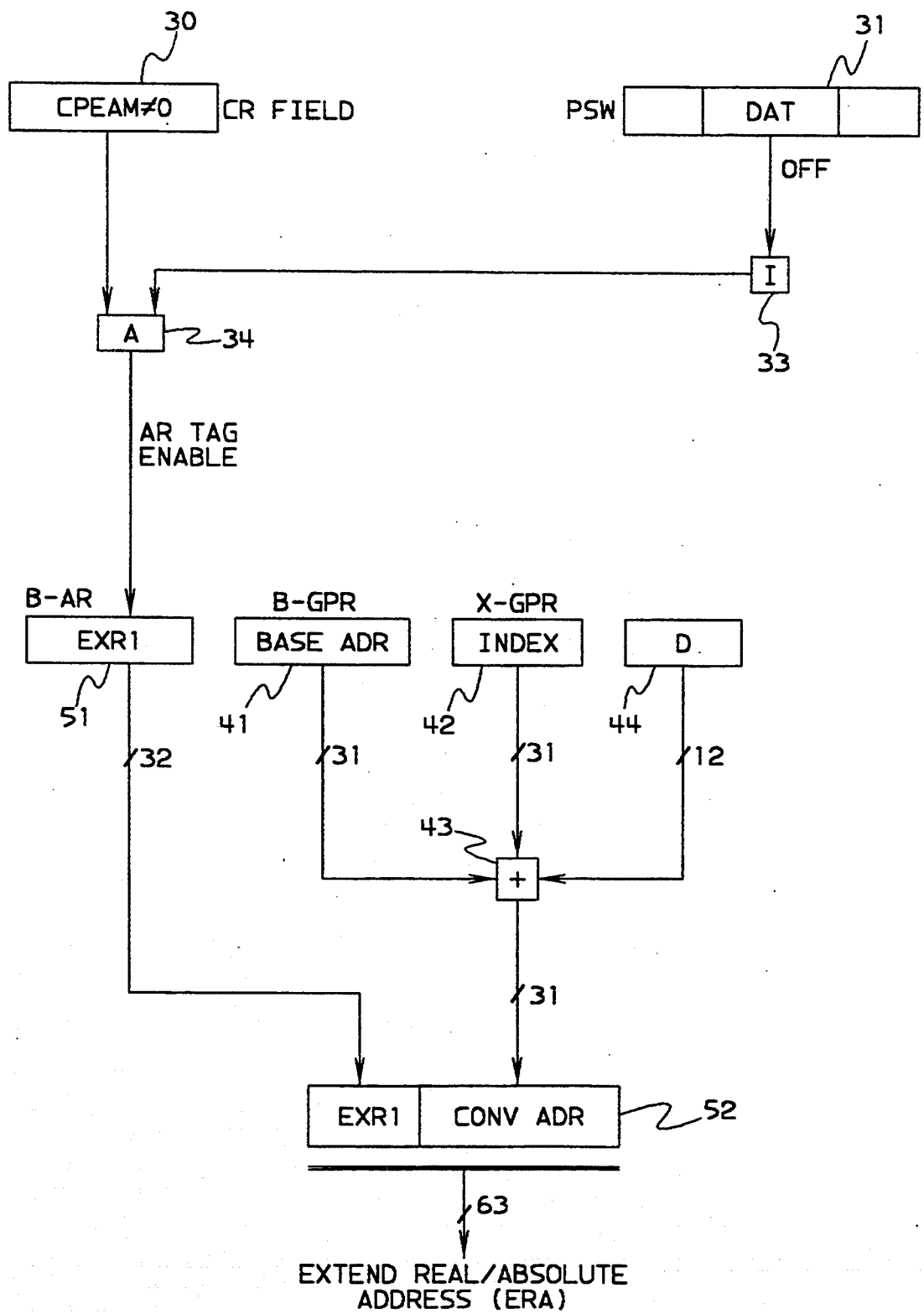
FIG. 3 represents a DAT-OFF mode in the described embodiment for extending small real addresses provided by a central processor to enable use of a very large memory.

Extended Real Addressing with DAT-OFF (FIG. 3)

The prior method of generating CP small real addresses is different during DAT-OFF mode than during DAT-ON mode. During DAT-OFF mode, no page-crossing recognition is needed when a logical address crosses a page frame boundary, because adjacent real storage locations are adjacent in the memory even when they are in different pages frames. But when a DAT-ON logical address crosses a page boundary, the next required page frame will not likely be in the next adjacent real storage location. The DAT-ON mode must recognize the crossing of each page boundary in order to invoke address translation to find the actual memory location of the next required page frame. In the DAT-ON mode, the page translation process allows the next page to be in any page frame in the memory or on backing store, and a page fault signal is generated whenever a next requested virtual address crosses a page boundary to invoke the address translation process by accessing a designated segment table/page table to find the real address in memory of the next requested page frame.

Accordingly in this embodiment, DAT-OFF logical addressing has no need to, and does not, recognize 4 KB page boundary crossing. But in the embodiments, DAT-ON logical addressing must be aware of 4 KB page boundary crossings in order to invoke the virtual address translation process to find the next required real storage page frame into which is mapped that virtual address which crossed the page boundary.

However in the DAT-OFF embodiments, the crossing by a real address of a 2 GB section boundary in a very large memory may invoke a section fault, to allow the next DAT-OFF logical address to be mapped into any other section of the very large memory. However, if real-address incrementing to a next section is always to the next sequential section in the very large memory, then no section fault signalling is needed and only the EXR value needs to be incremented.

FIG. 3 shows an embodiment for generating extended-real-addresses. It provides an extender (EXR) for a CP small address when the CP is in the DAT-OFF state and its CPEAM is non-zero indicating the CP requires extended addresses. A non-zero CPEAM value indicates the CP is not operating in the compatibility mode (described with FIG. 2), in which case it requires extended addresses. An extended-real-address signal is outputted from an AND gate means 34 when it receives a CPEAM not=00 signal from CR field 30 and a DAT-OFF signal from PSW field 31, provided by the inverted state of the DAT bit. The signal from AND gate means 34 enables the ARs in that CP to be used in a novel manner, different from the way ARs were previously used. (Previously, ARs were only used in the DAT-ON mode to control the selection of virtual address spaces.) Here, the ARs are used in DAT-OFF mode for the totally different purpose of providing an address extender (EXR) for a small real address when virtual addressing is not being used. Thus, here the ARs are used for a real addressing purpose, where previously they were only used for virtual addressing.

All ARs are signalled, including B-AR 51 selected by the associated base GPR of the current instruction operand to outgate its content as the required EXR, which is concatenated at the high-order end of the small address generated by adder hardware 43 to provide a 63 bit extended real address (ERA) 52 for addressing the very large memory.

The base access register B-AR 51, index address register X-GPR 42, address displacement source D 44, and adder 43 may be conventional components like those found in current computers that generate a conventional 31 bit effective address (CONV ADR) from the components in each operand.

Also, crossing a 2 GB section boundary is handled differently in the DAT-OFF real addressing mode than in the DAT-ON virtual addressing mode. The incrementing of the real address may continue across any 2 GB boundary. But on a section boundary-crossing, an overflow occurs from the 31st bit position in the extended address to indicate a 2 GB section boundary has been crossed; and then the low-order bit position in the address extender field in the respective AR is incremented. The incrementing may be done by having the system control program sense the overflow indication and perform instructions that increment the EXR value in the respective AR to handle a boundary-crossing in DAT-OFF mode.

Any small address can be mapped into any section of a very large memory by putting any EXR value for the memory into the AR associated with the operand generating the small address.

Extenders in AR Lookaside Buffers (ALBs) with DAT-OFF

AR extenders generated in DAT-OFF mode may use an AR lookaside buffer (ALB) in each CP. (Previously, the ALBs were not used in the DAT-OFF mode.) When an AR extender field in an AR is accessed by an operand, its EXR may be copied into a corresponding EXR field in an accessed ALB entry. The EXR field is uniquely put into all ALB entries to accommodate this embodiment. After an ALB entry is initialized with an EXR, the EXR may be accessed from the corresponding ALB entry instead of being accessed from the respective AR. This is useful when all of the architected ARs are not built into the hardware registers, and the ALB is used for high-speed access.

Extended Real Addressing with DAT-ON (FIG. 4)

FIG. 4 represents memory extender (EXR) generation with DAT-ON in each CP in a system containing a plurality of CPs (three are represented, but any number from one and up may exist). ART hardware 120, 122 and 124 as well as DAT hardware 121, 123, 125 is shown for the different processors. Although each CP is represented as operating with DAT-ON, any CP could instead be operating with DAT-OFF.

In each CP, the address extenders are generated in a novel way during the address translation process. But the address extension process is separate from the address translation process, even though the address extension process is interwoven in a novel manner with the address translation process when the DAT-ON mode exists for enabling the address translation process. The extender is concatenated with the translated address (TA).

The address extension hardware shares the address translation hardware (ART or DAT hardware). Only one of the DAT-ON address extension techniques in FIG. 5, 6 or 7 would be used in a CP at any one time.

Figure 5:
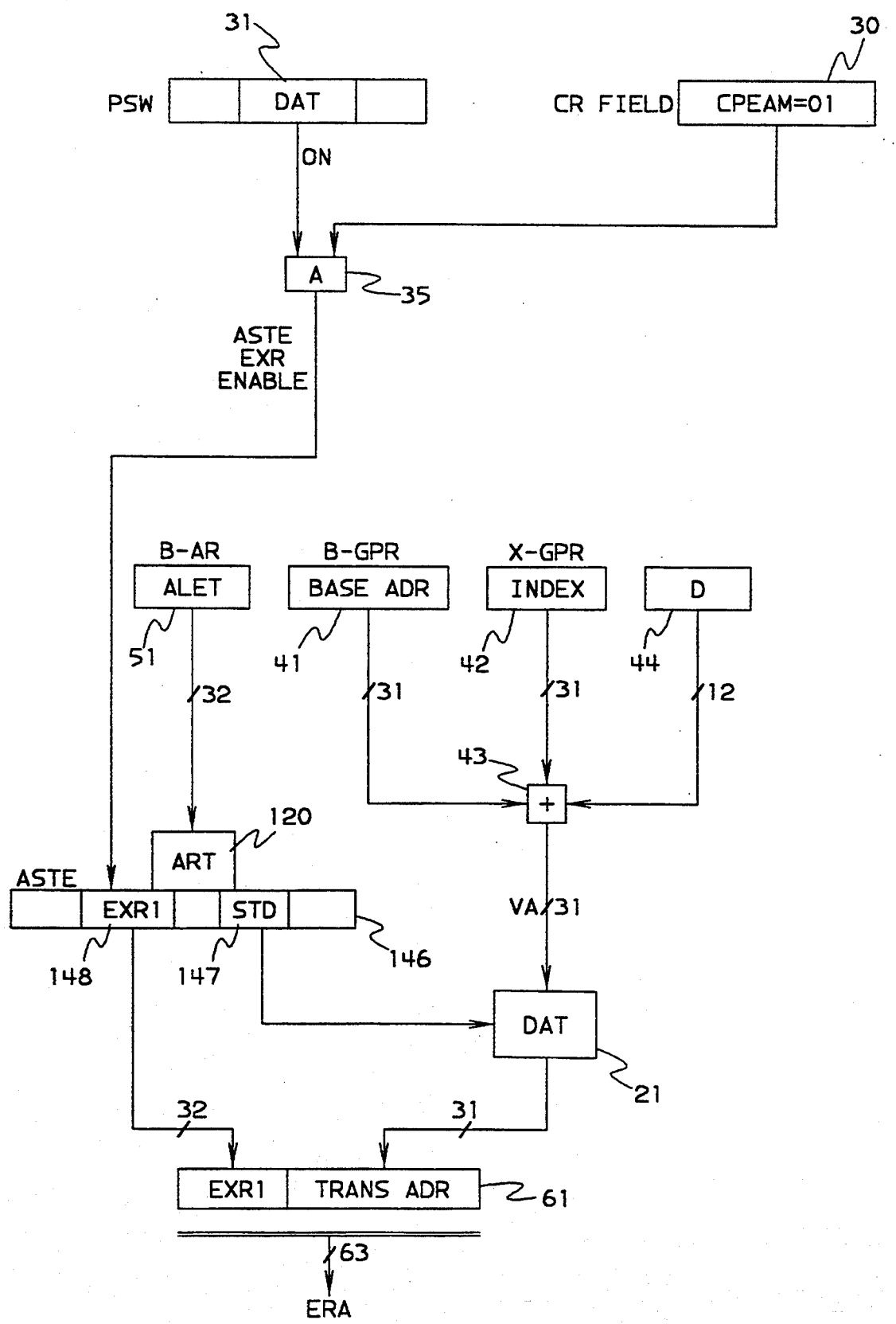
FIG. 5 represents an ASTE mode for extending small real addresses obtained by a central processor which is translating conventional small virtual addresses for generating extended addresses for accessing data in a very large memory.

The embodiment in FIG. 5 generates the EXR using the ASTE accessed by the ART hardware. The embodiment in FIG. 6 generates the EXR using the STE accessed by the DAT hardware. The embodiment in FIG. 7 generates the EXR from the PTE accessed by the DAT hardware. Novel modifications are made to the ASTE, STE or PTE hardware and processes for these address translation hardware and processes to accommodate any of these address extension processes.

The CPEAM field is set to a different CPEAM state for each of the novel ways the EXR may be generated. The described embodiments teach four different ways for generating a CP EXR. The three different ways of address extension for a CP's translated addresses may be used to provide varying degrees of flexibility in selecting the sections in a very large memory for mapping the processor's translated address.

Figure 6:
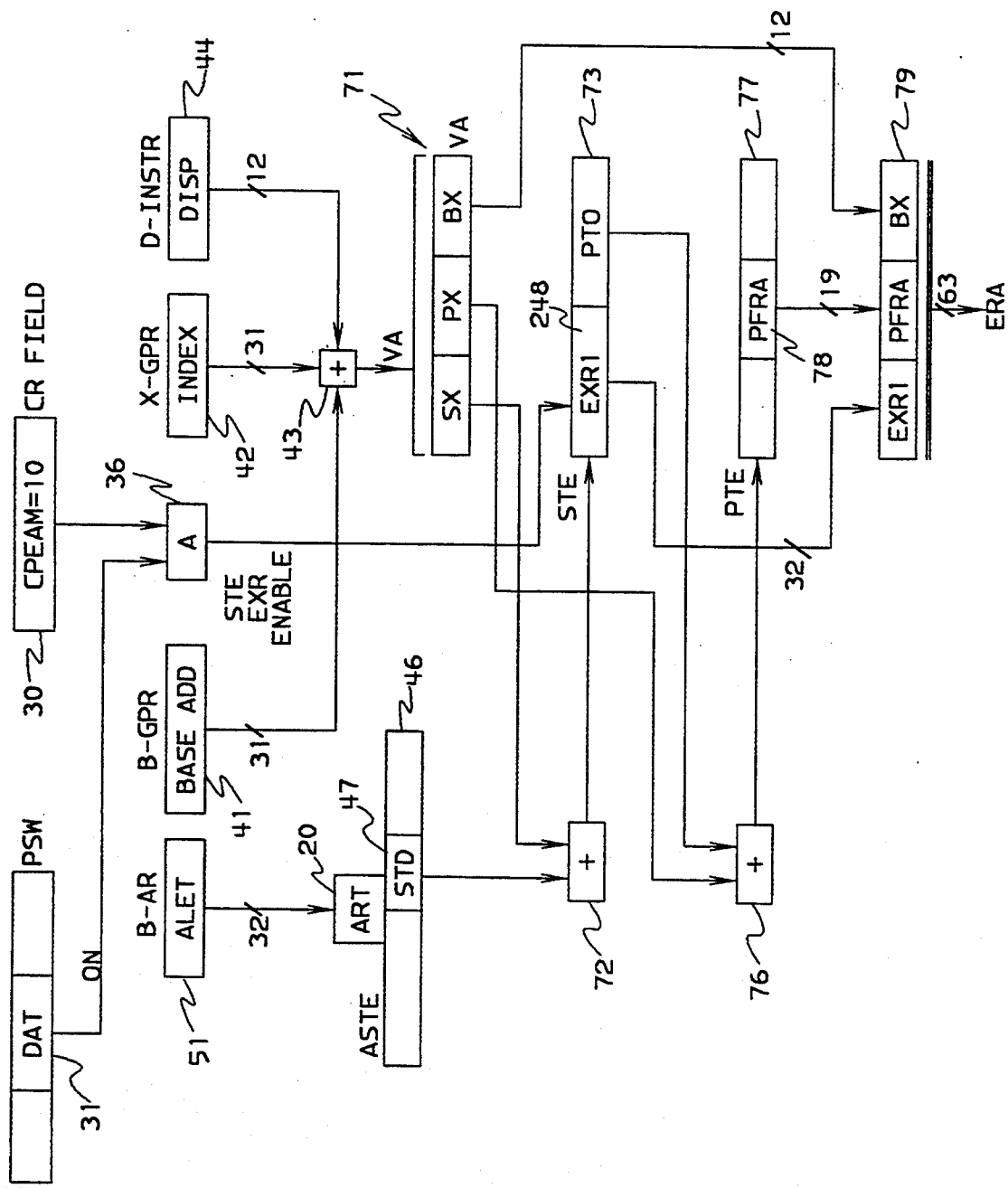
FIG. 6 represents an STE mode for extending small real addresses obtained by a central processor which is translating conventional small virtual addresses for generating extended addresses for accessing data in a very large memory.
Figure 7:
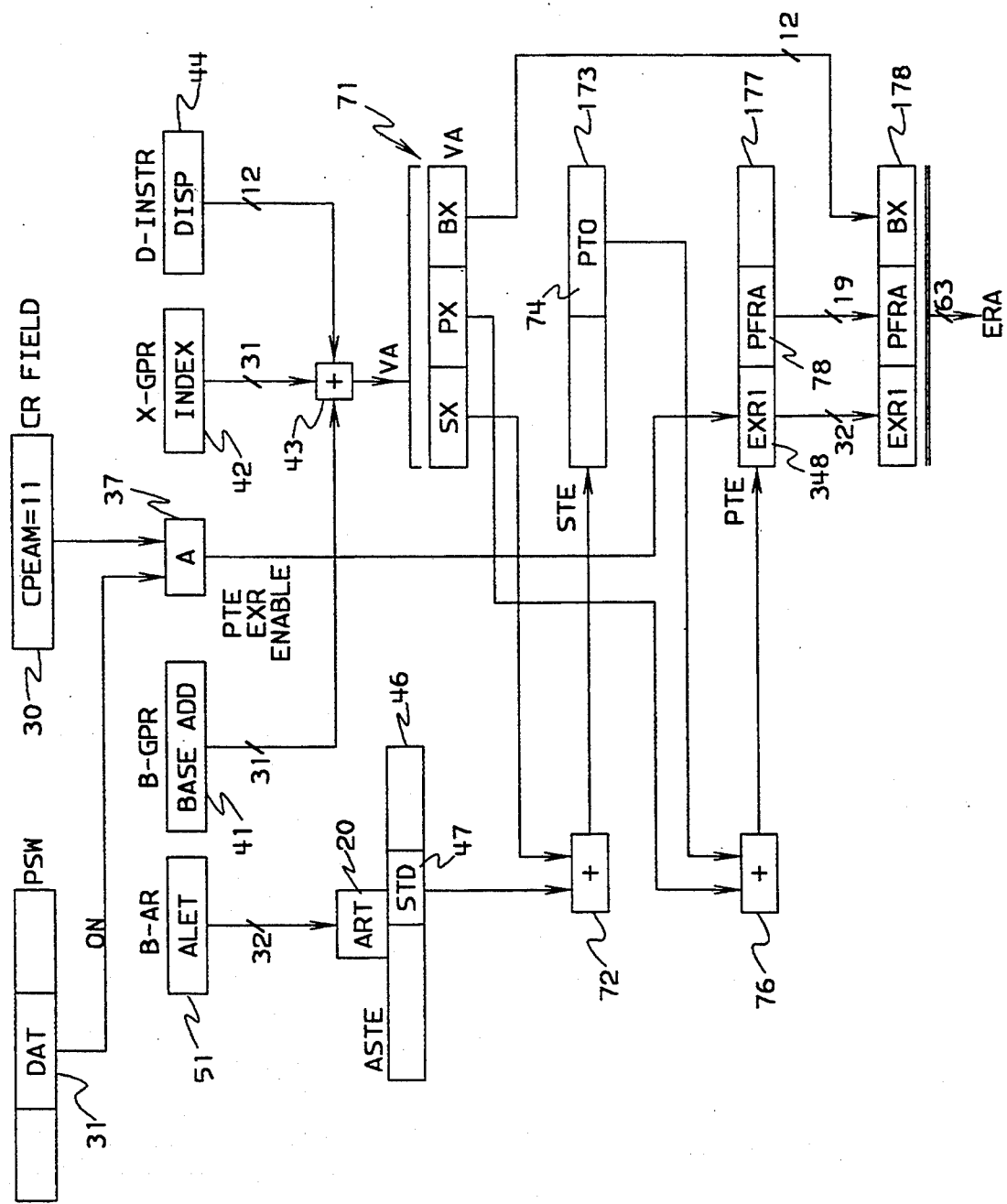
FIG. 7 represents a PTE mode for extending small real addresses obtained by a central processor which is translating conventional small virtual addresses for generating extended addresses for accessing data in a very large memory.
Figure 9:
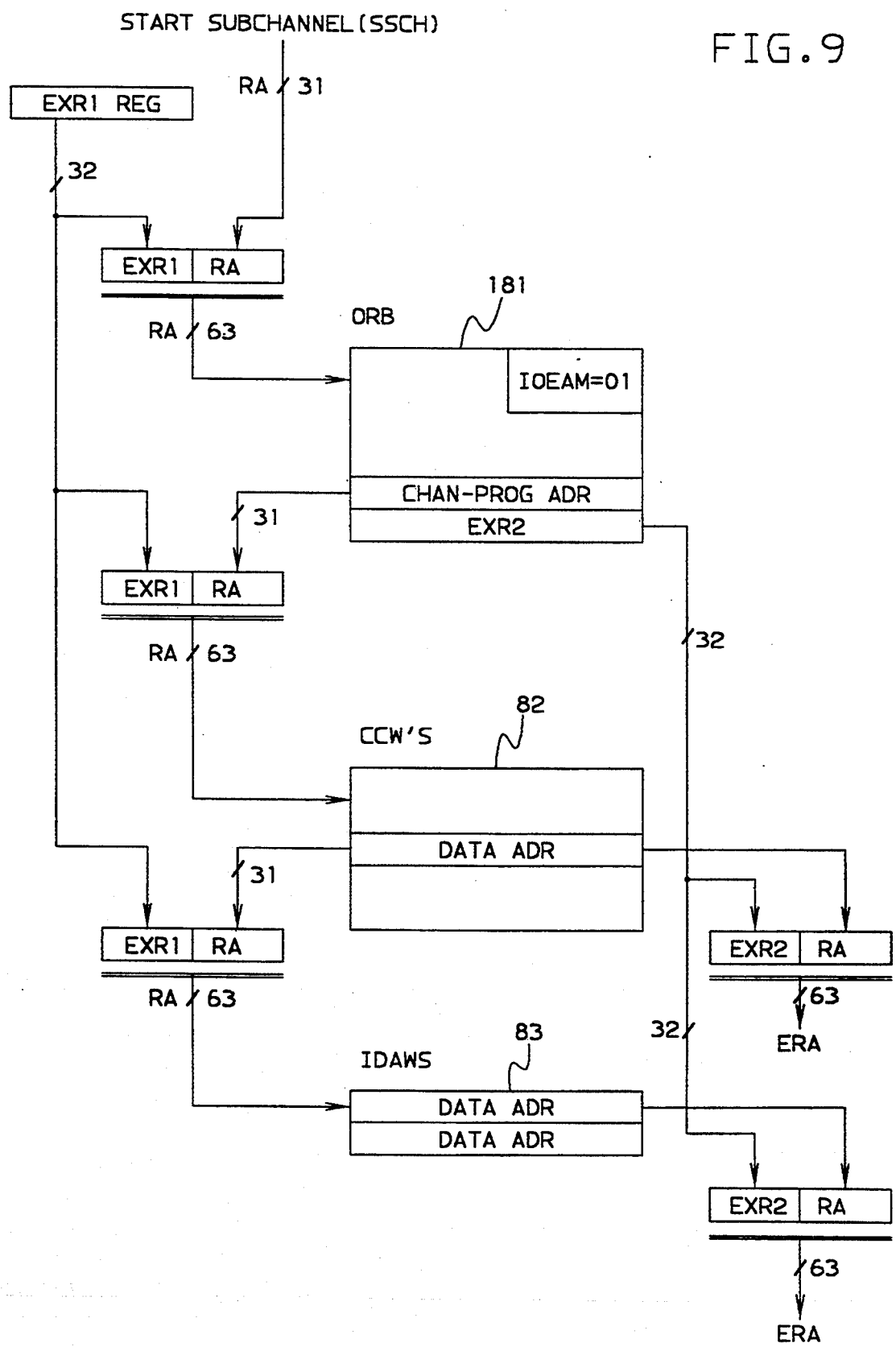
FIG. 9 represents an ORB mode for extending I/O data addresses in the described embodiment for enabling small I/O data addresses provided for I/O devices to read or write data in a very large memory.
Figure 10:
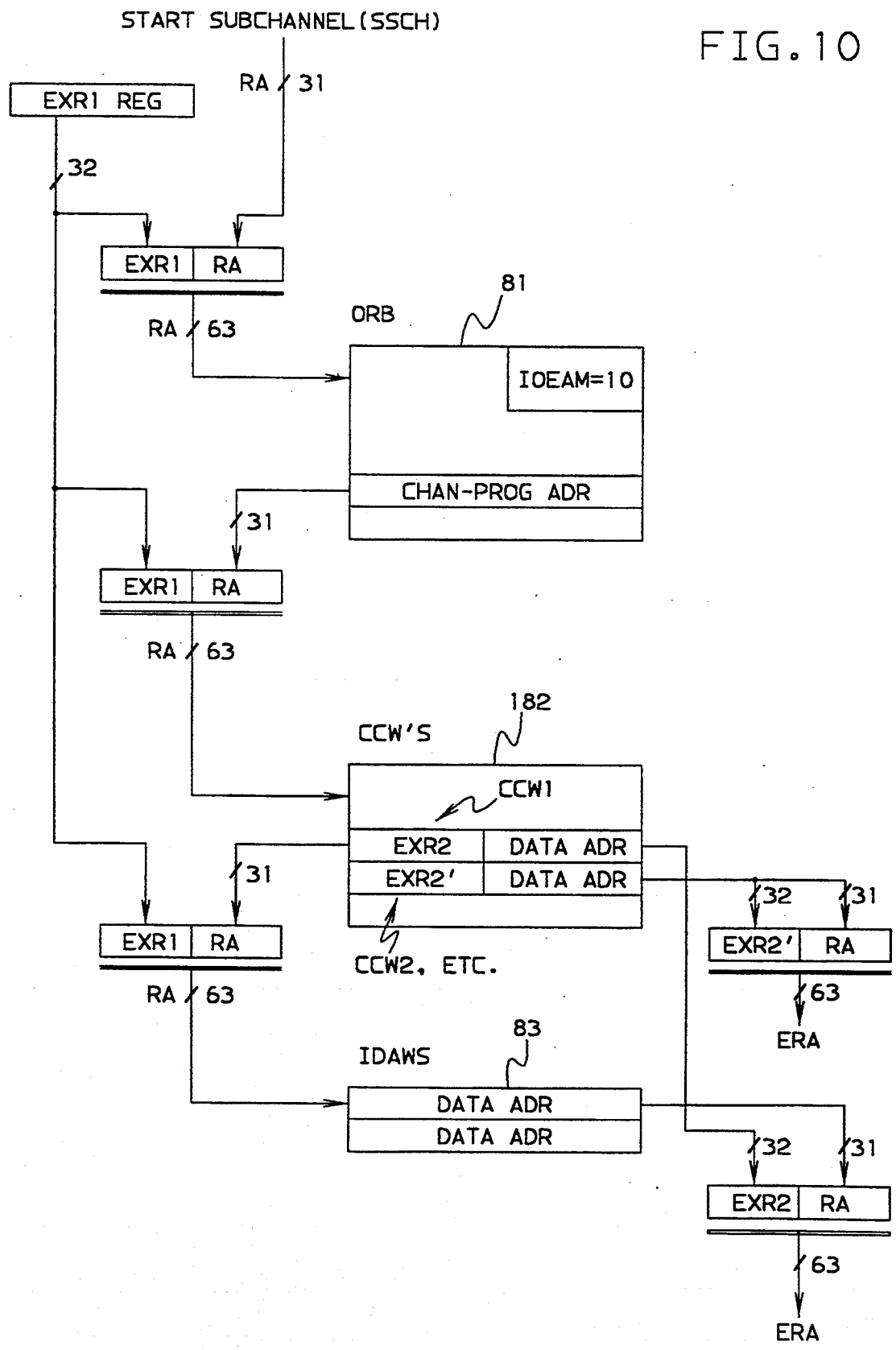
FIG. 10 represents a CCW mode for extending I/O data addresses in the descried embodiment for enabling small I/O data addresses provided for I/O devices to read or write data in a very large memory.
Figure 11:
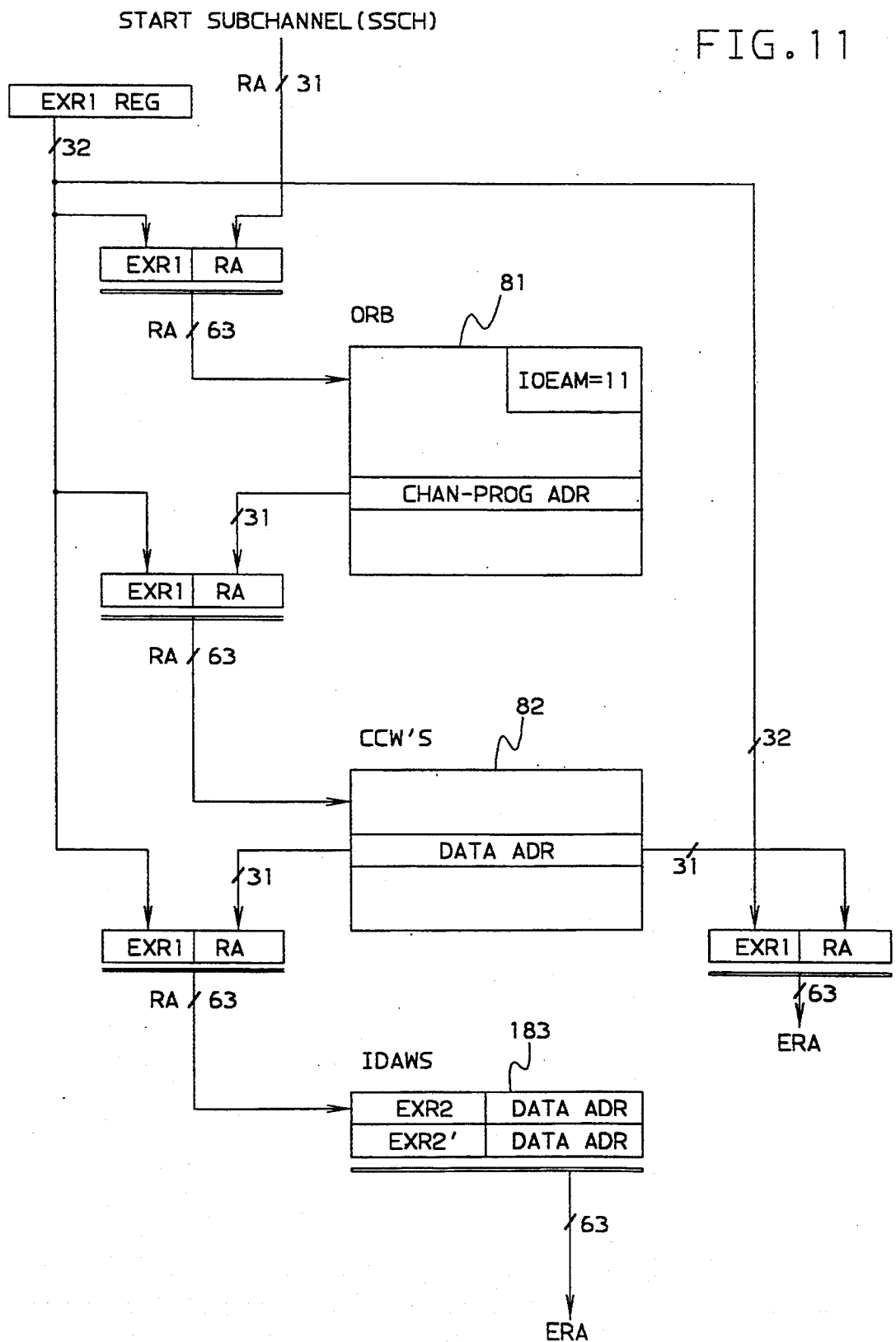
FIG. 11 represents an IDAW mode for extending I/O data addresses in the described embodiment for enabling small I/O data addresses provided for I/O devices to read or write data in a very large memory.

The EXR provided for a CP address is called EXR1 in FIGS. 5, 6 and 7 to distinguish it from the address extenders generated for I/O data addresses which are called EXR2 in FIGS. 9, 10 and 11. Hence EXR1 is a CP EXR, and EXR2 is an I/O EXR.

Extended Real Addressing Using an ASTE Extender (FIG. 5)

The embodiment in FIG. 5 operates with a CPEAM=01 setting in its CR extender type field 30 to indicate the use of ASTE EXR1 entries. An AND gate means 35 provides an ASTE EXR1 control signal when it receives both the CPEAM=01 signal from CR field 30 and the DAT-ON signal from PSW field 31.

The extender control signal from gate 35 activates the use of the ASTE EXR1 fields during the ART operation 120, in which EXR1 field 148 is outputted as the address extender from the ASTE 146 when it is accessed during the ART process to obtain its STD (segment table descriptor) field 147. Concurrently, ASTE 146 is accessed during the ART process 120 for translating an ALET in B-AR 51 to the content of STD 147, which contains a STO (segment table origin) field and an STL (segment table length) field. Address space selection is determined by the STO address in the ASTE's STD field by its selection of a segment table defining an address space. The ART/DAT process is done only when the DAT-ON state exists in the CP.

Although the ASTE EXR1 generation is unique, the ART/DAT process, itself, is conventional in FIG. 5 for generating a TA (translated address), as explained for FIG. 2. The outputted ASTE EXR1 is concatenated to the high-order end of the outputted TA to generate the extended real address (ERA), which is sent to the associated very large memory for accessing data located at this ERA.

All small addresses extended with the use of the same ASTE extender will map into the same section, which may be any section of a very large memory.

ASTE Extenders in AR Lookaside Buffers (ALBs)

An AR lookaside buffer (ALB) is conventionally used to speed up the accessing of address space translations for access registers in the ESA/390 systems, which avoid re-accessing an ASTE after it has been used in an address space translation operation. The ASTE address extension process may also use the ALB to obtain a ASTE EXR after the address translation process has been completed.

Thus, an ASTE extender field may be put into each entry in an AR lookaside buffer (ALB), which is filled with an EXR when an ASTE having an EXR is accessed during the virtual address space translation process for an AR. Thus an ASTE EXR field may be uniquely put into all ALB entries to accommodate this embodiment. After the ART operation has been done for selecting an address space, its ASTE EXR may thereafter be accessed from the ALB entry as long as it is valid, which is faster than repeating the ART, for all accesses to the virtual address space defined in that ALB entry.

Thus when an address extender field in an ASTE is initially accessed by an operand during the ART process, the ASTE EXR may be copied into the corresponding ASTE EXR field in the assigned ALB entry. Accordingly, after the ALB entry is initialized with an ASTE EXR, the ASTE EXR may be accessed from the corresponding ALB entry instead of being accessed from the respective ASTE.

Extended Real Addressing Using an STE Extender (FIG. 6)

The embodiment in FIG. 6 operates with a CPEAM=10 setting in the CR extender type field 30 to indicate an EXR1 field is in each STE (segment table entry). A STE extender control signal is generated by an AND gate means 36 which outputs an enabling control signal for STE extender operation when it receives both a CPEAM=10 signal from CR field 30 and a DAT-ON signal from PSW field 31.

Each STE 73 contains an EXR1 field 248 for use in extended address generation during any DAT process. (The EXR field does not exist in the STEs in the DATs in FIG. 1, 2, 4, 5 or 7.)

A signal from gate 36 indicates to the DAT hardware that the EXR1 field 248 in the selected STE 73 is to be used in generating an extended address. In FIG. 6, the ART process 20 is conventional for address space selection, as previously explained for FIG. 2. Also the DAT process is conventional except for EXR handling. But the STE manner of EXR1 generation during the DAT process is unique in FIG. 6. The EXR1 outputted from the STE is provided to a register 79 in which the extended real address (ERA) is generated by concatenating the EXR1 to the high-order end of the translated address, which contains the PFRA (page frame real address) outputted from the PTE and the Bx (byte address) field from the D value in the current operand. The ERA is sent from register 79 to the very large memory for accessing data located at the ERA.

All small addresses extended by using the EXR1 value in a particular STE are mapped into the same section of a very large memory. These addresses are the set of page frame real addresses within the PTEs addressed through that STE. This set of page frames generally are not contiguous in that memory section. In the ESA/390 systems, each STE addresses a set of pages that total 1 MB.

Extended Real Addressing using a PTE Extender (FIG. 7)

The embodiment in FIG. 7 operates with a CPEAM=11 setting in a CR extender type field to indicate an EXR1 field is in each PTE (page table entry). A PTE extender control signal is generated by an AND gate means 37 which provides an enabling output signal for PTE extender operation when it receives both a CPEAM=11 signal from CR field 30 and a DAT-ON signal from PSW field 31.

Each PTE 177 contains an EXR1 field 348 for use in extended address generation during any DAT process. (The EXR field does not exist in the PTEs in FIG. 1, 2, 4, 5 or 6.) A signal from AND gate 37 indicates to the DAT process that each PTE 177 contains an EXR1 field 348 for use in extended address generation during any DAT process.

In FIG. 7, the conventional ART process 20 is used for address space selection in the manner previously explained herein for FIG. 2. Also the DAT process is conventional except for EXR processing. But the PTE manner of EXR1 generation during the DAT process is unique in FIG. 7. The EXR1 outputted from the PTE is provided to a register 178 in which the extended real address (ERA) is generated by concatenating the EXR1 to the high-order end of the translated address, which contains the PFRA (page frame real address) outputted from the PTE and the Bx (byte address) field from the D value in the current operand.

The ERA is sent from register 178 to the very large memory for accessing data located at the ERA.

This PTE address extension technique enables any small virtual address requiring DAT to have its translated real address mapped into a page frame located in any section of a very large memory, since the EXR1 value can be made unique to each page (in its respective PTE). In the ESA/390 systems, each page contains 4096 bytes.

STE and PTE Extenders in TLB

It is conventional to put a virtual address translation in a TLB (translation lookaside buffer) and access the translated real address from the TLB after the translation is made, due to the TLB providing a faster access. An STE and PTE extender field may also be put into an assigned TLB entry, so that EXR1 can be provided when the translated real address is requested. Accordingly, each TLB entry is provided with an EXR1 field to receive an STE or PTE EXR1. Then the TLB EXR1 may be accessed instead of the STE or PTE. Thus, use of the TLB avoids having to access the respective STE or PTE, which would greatly slow down the address extension process if done.

Extended Real Addressing for CP Programs and Control Blocks

Thus far in this detailed description, only the CP operand data addresses have been extended with the EXR1 values.

No EXR has thus far been provided for the CP programs and CP control blocks, such as used by the ART-/DAT processes. In this case, the CP programs and CP control blocks are put only in the first section of the very large memory because an all zero extender is implied by the lack of an explicit extender for them.

However, an explicit EXR value can be provided for the CP programs and CP control blocks, such as by providing an EXR3 value in another control register (CR) field for use by them. (The CP data could be put into the same memory section as the CP program and CP control blocks by also using EXR3 as the CP data extension.)

A unique section selection can be provided for the DAT accessed control blocks (ST and PT) by using the EXR1 field in the ASTE as the address extender for the STO (segment table origin) in that ASTE (which locates the ST to be used by the DAT process), and as the address extender for the PTO (page table origin) addressed in the accessed STE. Alternatively, the EXR in the ASTE can only be used as the extender for the accessed STO, and then the STE obtained in the ST accessed through that extended STO address can contain an EXR which is used to extend the address of the PTO in the obtained STE. These techniques allow the accessed ST and PT to be located in any section of the very large memory.

Extended Real Addressing for I/O Data

I/O data accessing is done in the same very large memory as CP data accessing. I/O data accessing instructions and programs generally use the same small address formats as are used by CP addressing, such as 31 or 24 bit addresses. Accordingly, the same type of address extensions apply to adapting I/O data small addresses to a very large memory as apply to CP small addresses. Generally, I/O data addresses are real addresses not requiring address translation, which ignore the DAT state of the current PSW. I/O data accessing is asynchronous with CP data accessing.

The different characteristics of I/O and CP data addresses causes different ways to be used for providing address extensions for I/O data addresses and for CP small addresses. The extenders for I/O data small addresses may be provided in any of the control blocks associated with an I/O device program, with differing mapping characteristics resulting therefrom. This contrasts with providing address extenders for CP small real addresses in a register associated with each operand's B field.

I/O data addressing in an ESA/390 system is initiated by a start subchannel (SSCH) instruction, which is used in the described I/O address extender embodiments. SSCH is a CP instruction (not an I/O instruction), and SSCH has a single operand that provides a logical address for accessing an ORB (operation request block). The ORB address may be real or virtual according to whether the DAT-OFF mode or DAT-ON mode is on the CP's PSW. The address fields within the ORB, and within the other I/O control blocks assessed through the ORB (e.g. CCW's and IDAWs) always contain real addresses regardless of the DAT setting in the current PSW. The ORB addresses the I/O control program, comprised of a sequence of CCWs (channel control words). Any CCW in the channel program may address a block of one or more IDAWs (indirect address words) that allow the I/O data to be accessed in non-contiguous blocks in memory.

The SSCH, ORB, CCWs and IDAWs and their operation is in the prior art to this invention. But the way extended addressing is interwoven with the I/O data accessing processes and hardware is novel to this invention.

The described I/O embodiments have an IOEAM, which is an I/O EAM field having any of plural values for identifying the type of I/O EXR (called EXR2) being used in a particular embodiment. Each I/O embodiment also uses a CP embodiment with a CPEAM field, since each I/O embodiment requires a CP embodiment to execute CP instructions (which may use extended CP addressing) to initiate I/O data accessing using extended addressing.

The CPEAM field and the IOEAM field are initially set by a system control program to one of their possible values according to the degree of flexibility required by each in section assignment for the currently executing CP and I/O programs. The setting of the CPEAM selects the field from which a CP address extender (EXR1) is obtained, and the setting of the IOEAM selects the field from which a I/O address extender (EXR2) is obtained. The CP and I/O EAM settings may be made independently of, or dependently on, each other, according to a system control program's current requirements.

If the DAT-OFF mode exists and a non-zero CPEAM indicates use of extended addressing, the processor extender (EXR1) is derived from an AR accessed by the B field of the current operand, as previously described herein for the embodiment in FIG. 3. If the DAT-ON mode exists, the processor extender (EXR1) is derived from either the ASTE, STE or PTE, according to the current CPEAM setting, as previously described herein for the embodiment in FIGS. 5, 6 and 7.

The CPEAM and IOEAM settings control the 2 GB section mapping flexibility for the CP and I/O data in a very large memory. In some I/O embodiments, the setting of the IOEAM may be done independently of the CPEAM setting.

Further, the choice of the types of real addressing operation may be restricted in the design of a computer system, wherein the CPEAM and IOEAM may have a lesser number of settings than provided in the described embodiments. For example, CP real addressing might be restricted to the three modes (using two CPEAM settings and the DAT-OFF mode in the PSW): compatible (FIG. 2), DAT-OFF extended (FIG. 3), and one of the three DAT-ON extended (FIG. 5, 6 or 7). And the IOEAM might be restricted to two settings: I/O compatible (in FIG. 8) and one of the I/O extended (in FIG. 9, 10 or 11).

The use of separate CPEAM and IOEAM fields allow independent address extension control for CP and I/O accessing in the described embodiments. But such option can be constrained by the value chosen for the IOEAM and EXR2 fields.

The IOEAM field is located in the ORB in all of the I/O extender embodiments represented herein, because the ORB is a control block common to all I/O data currently being accessed by an I/O program for an I/O device.

Figure 8:
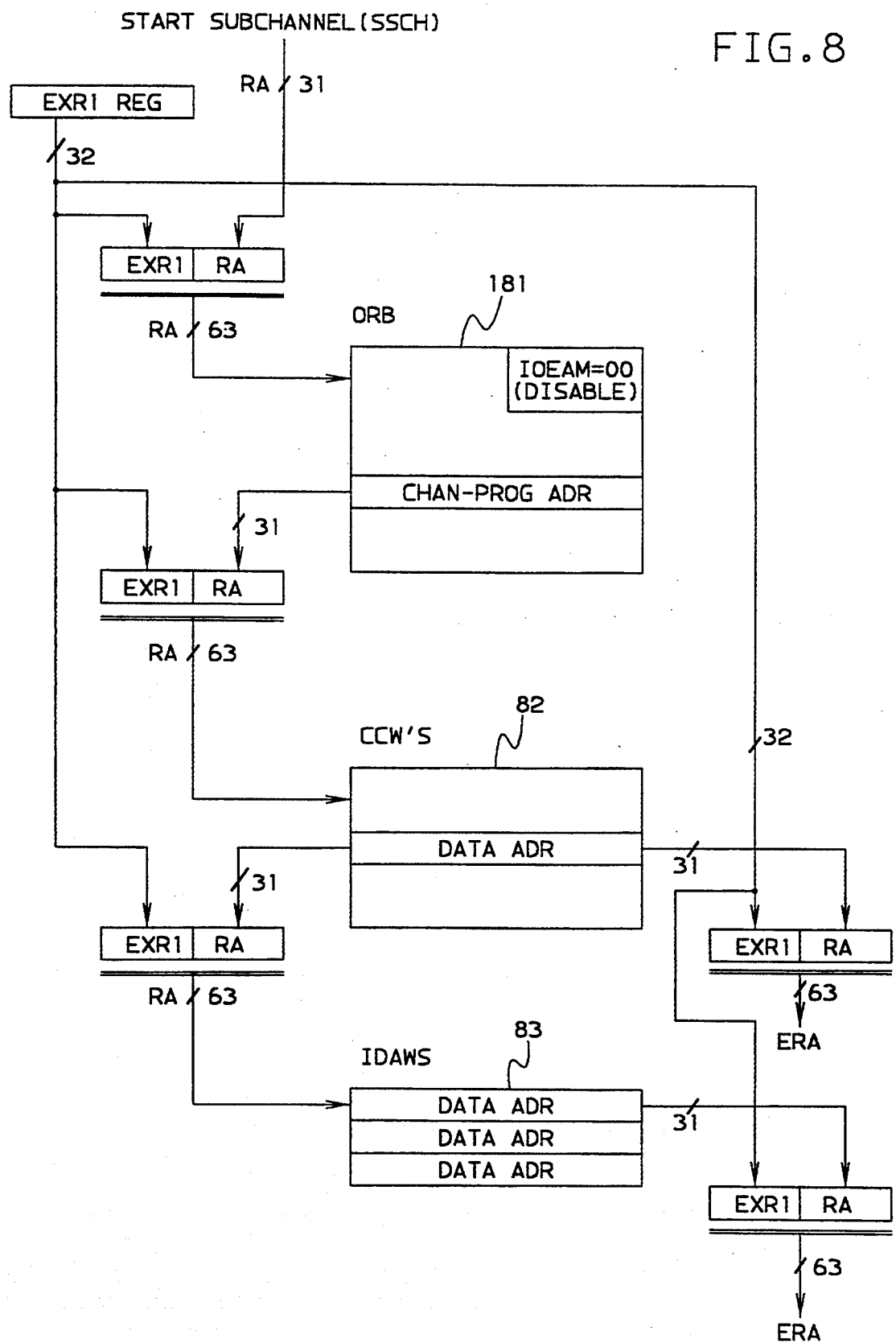
FIG. 8 represents a compatibility mode in the described embodiment for enabling small data addresses, provided for I/O devices being controlled by programs using small addresses to read or write data in a very large memory.

Compatible Extended Real Addressing for I/O Data (FIG. 8)

FIG. 8 represents a downwardly compatible I/O extended address mode, which is indicated by the IOEAM field being set to 00 (IOEAM=00). The I/O compatible mode causes the processor address extender (EXR1) to also be used as the I/O address extender (EXR2), i.e. EXR2=EXR1. The consequence is that the I/O data will be mapped into the same section as the CP data. If the the CPEAM=00 setting is used (indicating the CP is operating in its downwardly compatible mode), then both the CP and I/O data will all be mapped into the first section of a very large memory without any extension being used for either the CP or I/O data.

In FIG. 8, the CPEAM may be set to any of its binary values (00 to 11). However if a non-zero setting of CPEAM is used, then the CP address extender (EXR1) is also the I/O address extender (EXR2). And both the processor data and the I/O data are put into the same section of the very large memory, which can be any section in the memory as designated by EXR1. Here, the CP EXR has the dual role of being used as the extender for both the CP data addresses and the I/O data addresses. Thus if the CPEAM has a non-zero value, the processor extender may be derived from any one of the ASTE, STE, PTE or AR according to the non-zero value of the CPEAM and whether the DAT-ON or DAT-OFF mode exists.

ORB Extended Real Addressing Control for I/O Data (FIG. 9)

FIG. 9 provides the address extender EXR2 in a field in the ORB control block. Putting the EXR2 field in the ORB constrains the mapping of all I/O data controlled by the ORB, by mapping it into the memory section defined by the current ORB EXR2 value.

An IOEAM=01 setting indicates the EXR2 field is in ORB 181, which is the primary control block for the sub-channel program initiated by an executed SSCH instruction. The value in EXR2 is used as the address extender for all I/O data to accessed by the small real addresses contained in the CCWs 82 and IDAWs 83 of the channel program initiated by this SSCH instruction. The resulting extended real addresses (ERAs) are used for accessing data in the very large memory.

However, the extension for the control blocks (ORB 181, CCW block 82 and IDAW block 83) in FIG. 9 is EXR1 controlled by the CPEAM setting which maps the I/O control blocks in the memory section containing the CP data. Thus, the I/O data accessed by the I/O program is mapped by the EXR2 value into any section in the very large memory independently of the section containing the I/O control blocks located by using EXR1.

The 2 GB memory section designated by the content of the EXR2 field in the ORB 181 may be different from the 2 GB memory section designated by the content of the EXR1 field selected by the current CPEAM setting. Accordingly, a non-zero IOEAM setting allows the CP and I/O data associated with that I/O operation to be mapped into different sections of the memory when the EXR1 and EXR2 fields contain different extender values.

CCW Extended Real Addressing Control for I/O Data

FIG. 10 represents the embodiment that has an EXR2 field in each CCW of a sub-channel (I/O) program, which is indicated by an IOEAM=10 setting in the IOEAM field in the ORB block of the I/O program being currently executed. Then an I/O program having a plurality of CCWs can have a respective plurality of EXR2 fields, which may be respectively set to any sections in the memory. That is, the respective EXR2 fields in the CCWs may be set to the same or to different EXR2 values. The EXR2 field with a particular CCW extends only the data ERAs (extended real addresses) generated by that CCW and by any IDAW(s) accessed through that CCW. The resulting ERAs are sent to the very large memory for accessing the requested I/O data. FIG. 10 illustrates two possibilities, using an IDAW or not using an IDAW. The second CCW shown in FIG. 10 does not use an IDAW. It may have a different address extender than the preceding CCW. This is indicated by calling it EXR2'.

However, the extension for the control blocks (ORB 81, CCW block 182 and IDAW block 83) in FIG. 10 is EXR1 controlled by the CPEAM setting which maps the I/O control blocks in the memory section containing the CP program which issued the SSCH instruction that initiated the I/O program. Hence, the I/O data accessed by this I/O program is independently mapped by the EXR2 value into any section to allow the I/O program to be in a different section from the CP program and from the CP data in the very large memory.

Thus, the effect of IOEAM=10 is to allow the accessed I/O data locations to be mapped into any of the 2 GB sections of a very large memory as designated by the contents of the different CCW EXR2 fields. Thus high section-selection flexibility is obtained allowing a different section to be used for each CCW, which may be different from the memory sections selected by the current EXR1 value(s) controlling the mapping of the current CP data.

IDAW Extended Real Addressing Control for I/O Data

Prior I/O programs may have an IDAW block (containing a sequence of one or more IDAWs) addressed by a CCW in an I/O program. Each IDAW contains a small real address for locating I/O data in a memory. Different CCWs in an I/O program can address different IDAW blocks. Some I/O programs may comprise a single CCW which addresses a single IDAW block containing a large number of IDAWs that address scattered memory locations for the I/O data accessed by that program. This embodiment enables the small addresses provided by the IDAWs in a block to be located in different sections of a very large memory.

FIG. 11 represents the IDAW embodiment, which is indicated by an IOEAM=11 in the ORB IOEAM field of a sub-channel (I/O) program, wherein each IDAW of the program is provided with an EXR2 field.

Any IDAW's EXR2 field may be set to represent any available section in the memory. The EXR2 field of a particular IDAW extends only the small address generated for that IDAW. That is, the respective EXR2 fields of the IDAWs may be set to the same or to different EXR2 values, e.g. EXR2'. Then an I/O program having a plurality of IDAWs has a respective plurality of EXR2 fields, which may be respectively set to any sections in the memory. That is, the respective EXR2 fields in the IDAWs may be set to the same or to different EXR2 values.

The EXR2 field with a particular IDAW extends only the data ERAs (extended real addresses) generated by that IDAW. The resulting ERAs are sent to the very large memory for accessing the requested I/O data.

The CCWs in FIG. 11 do not have EXR fields (although another IOEAM mode could be easily provided in which the CCWs that do not address IDAWs also have EXR2 fields). In the FIG. 11 embodiment, the CCW data addresses are extended with the EXR1 obtained from the CPEAM, so that CCW addressed data is put into the same section as the CP data, and the IDAW addressed data in the same I/O program may be put in other sections of the very large memory.

The address extension for the I/O control blocks (ORB 81, CCW block 82 and IDAW block 183) in FIG. 11 is EXR1 controlled by the CPEAM setting. Hence, the I/O control blocks are located in the memory section containing the CP program which issued the initiating SSCH instruction. Thus, the I/O data accessed by the I/O program may be located by the EXR2 value in any section in the very large memory independently of the section containing the CP program.

Thus, the effect of IOEAM=11 is to allow resulting extended real addresses (ERAs) generated for the IDAWs to be mapped into one or more different sections of the very large memory, which may be different from the section receiving I/O data directly addressed by the CCWs in the same I/O program. Thus, high flexibility is obtained in the selection of the memory sections for I/O data by allowing the use of IDAWs to control the selection of sections of the memory different from the data addresses in the CCWs of the same program. Accordingly, a large number of different sections of the memory may be used when the IDAW EXR2 fields contain different extender values.

While the invention has been described with references to the preferred embodiments thereof, various modifications and changes will become apparent to those skilled in the art which may be made without departing from the true spirit and scope of the invention as defined by the appended claims.

Having thus described our invention, what we claims as new and desire to secure by Letters Patent is:

1. A computer system having a central processor (CPU) for executing programs containing instructions having operands providing small addresses not exceeding 32 bits designed for accessing any location in a small memory having a capacity not exceeding 2**31 data units, the small addresses being either virtual addresses or real addresses according to a setting of a dynamic address translation (DAT) field in a program status word (PSW) in the CPU, the small addresses having a one-to-one relationship to physical locations in the small memory when operating in real address mode, each physical location having a capacity for storing one unit of data, and the small memory having a small address range including all small address locations in the small memory, the CPU containing access registers (ARs) associated with general registers (GRs), and the computer system comprising a large memory having multiple sections, each section having a section size equal to the small address range, large addresses being used for accessing any location in the large memory, the large addresses being real addresses having a one-to-one relationship to all physical locations in the large memory, an AR being selected by a base GR designated in an operand, the base GR having a content, the selected AR being associated with the base GR, the AR having a content containing a section address when the DAT field in the PSW indicates a real address mode requiring small addresses in current operands to be real addresses, and the AR content being an ALET (access list entry token) when the DAT field in the PSW indicates a virtual address mode requiring the small addresses of current operands to be virtual addresses, section selection means responsive to the AR content (a section address) and to the setting of the DAT field for selecting one of the sections of the memory when the DAT field in the PSW indicates the real address mode for small addresses, memory accessing means for utilizing the small addresses for accessing locations in the selected section to effectively represent large memory addresses as a concatenation of the associated AR content and the GR content for uniquely locating all data units in the large memory when the DAT field in the PSW indicates the real address mode, the AR content having multiple uses controlled by settings of the DAT field in the PSW, including selection among plural sections of a large memory when the DAT field in the PSW is set to a real addressing state (DAT-off state), and selection among plural virtual address spaces when the DAT field in the PSW is set to a virtual addressing state (DAT-on state), a large memory mode register containing a value for indicating small addresses of an executing program are accessible in any section of the large memory, the DAT field in the PSW being set to the DAT-on state for enabling the translation of virtual addresses and for enabling the AR content for virtual address space identification and disabling the AR content for containing any memory section address, a section register for containing a section address of the large memory, a virtual addressing construct associated with an address translation table used by address translation hardware/microcode in the CPU to translate small and large virtual addresses into translated small real addresses whereby the size of the virtual addresses is independent of the size of the translated small real addresses, a section address located in the virtual addressing construct, the section address identifying a section of the large memory for being addressed by the translated small addresses, and means for transferring the section address from the virtual addressing construct into the section register when the virtual addressing construct is accessed during a virtual address translation operation, and means for addressing a selected section of the large memory with the translated small real address to locate data required by an executing program.

2. A computer system utilizing small addresses for accessing locations in a large memory, as defined in claim 1, in which the virtual addressing construct is a predetermined type of translation control entry stored in the large memory and used by the address translation hardware/microcode for translating the small virtual addresses, and the translation control entry of the predetermined type has a section selection field for containing a section address, the section address locating a section in the large memory for obtaining data addressed by small real addresses in an executing program translated by using the translation control entry of the predetermined type containing the section address.

3. A computer system utilizing small addresses for accessing locations in a large memory, as defined in claim 2, in which the virtual addressing construct is a translation table identifier in a list of translation table identifiers stored in the large memory and used by the address translation hardware/microcode for translating the small virtual addresses, and each translation table identifier has a section selection field for containing a section address, the section address locating a section in the large memory for obtaining data addressed by small addresses translated by using the translation table identifier containing the section address.

4. A computer system utilizing small addresses for accessing locations in a large memory, as defined in claim 1, in which the virtual addressing construct is a predetermined type of translation table entry in a translation table stored in the large memory and used by the address translation hardware/microcode for translating the small virtual addresses, and the translation table entry of the predetermined type has a section selection field for containing a section address, the section address locating a section in the large memory for obtaining data addressed by translated small real addresses using the translation table entry containing the section address.

5. A computer system utilizing small addresses for accessing locations in a large memory, as defined in claim 4, in which the virtual addressing construct is any segment table entry in a translation table stored in the large memory and used by the address translation hardware/microcode for translating small virtual addresses, and each segment table entry has a section selection field for containing a section address, the section address locating a section in the large memory for obtaining data addressed by any translated small real addresses using the segment table entry containing the section address.

6. A computer system utilizing small addresses for accessing locations in a large memory, as defined in claim 4, in which the virtual addressing construct is any page table entry in a translation table stored in the large memory and used by the address translation hardware/microcode for translating small virtual addresses, and each page table entry has a section selection field for containing a section address, the section address locating a section in the large memory for obtaining data addressed by any translated small real addresses using the page table entry containing the section address.

7. A computer system having a central processor (CPU) for executing programs containing instructions having operands providing small addresses not exceeding 32 bits designed for accessing any location in a small memory having a capacity not exceeding 2**31 data units, the small addresses being either virtual addresses or real addresses according to a setting of a dynamic address translation (DAT) field in a program status word (PSW) in the CPU, the small addresses having a one-to-one relationship to physical locations in the small memory when operating in real address mode, each physical location having a capacity for storing one unit of data, and the small memory having a small address range including all small address locations in the small memory, the CPU comprising access registers (ARs) associated with general registers (GRs) and the computer system comprising a large memory having multiple sections, each section having a section size equal to the small address range, large addresses being used for accessing any location in the large memory, the large addresses being real addresses having a one-to-one relationship to all physical locations in the large memory, an AR being selected by a base GR designated in an operand, the base GR having a content, the selected AR being associated with the base GR, the AR having a content containing a section address when the DAT field in the PSW indicates a real address mode requiring small addresses in current operands to be real addresses, and the AR content being an ALET (access list entry token) when the DAT field in the PSW indicates a virtual address mode requiring the small addresses of current operands to be virtual addresses, section selection means responsive to the AR content (a section address) and the setting of the DAT field for selecting one of the sections of the large memory when the DAT field in the PSW indicates the real address mode for small addresses, memory accessing means for utilizing the small addresses for accessing locations in the selected section to effectively represent large memory addresses as a concatenation of the associated AR content and the GR content for uniquely locating all data units in the large memory when the DAT field in the PSW indicates the real address mode, the AR content having multiple uses controlled by settings of the DAT field in the PSW, including selection among plural sections of a large memory when the DAT field in the PSW is set to a real addressing state (DAT-off), and selection among plural virtual address spaces when the DAT field in the PSW is set to a virtual addressing state (DAT-on), a large memory mode register containing a predetermined value for identifying a source containing a section address for locating a section in the large memory in which data is accessed by small addresses of instruction operands of an executing program, and an I/O section mode register containing a predetermined value for identifying a source containing a section address for locating a section in the large memory in which small addresses in an I/O program are used to access data for being transferred between the large memory and an I/O device.

8. A computer system utilizing small addresses for accessing locations in a large memory, as defined in claim 7 in which the I/O section mode register contains a predetermined value for identifying the content of the large memory mode register as also identifying the source of the section address to be used by small addresses in I/O programs requested by the executing CPU program.

9. A computer system utilizing small addresses for accessing locations in a large memory, as defined in claim 7, in which an I/O control block (ORB) is used for initiating execution of an I/O program requested by the executing CPU program, and a section address field being provided in the I/O control block for containing a section address, means for transferring the section address from the section field in the I/O control block to a section field register, and means for selecting a section of the large memory addressed by the section address in the section field register for each small address provided by a requested I/O program.

10. A computer system utilizing small addresses for accessing locations in a large memory, as defined in claim 9, in which the I/O section mode register contains a predetermined value identifying the I/O control block as the source containing the section address to be used by small addresses in the I/O programs.

11. A computer system utilizing small addresses for accessing locations in a large memory, as defined in claim 7, further comprising a plurality of channel control words (CCWs) included in each I/O program, and an indirect data address word (IDAW) being a type of CCW contained in the I/O program in which each IDAW addresses an IDAW list of small addresses in the large memory, and a section address field being provided in each IDAW for containing a section address, means for transferring the section address from the section field in an IDAW when the IDAW is accessed for an executing I/O program, means for selecting a section of the large memory addressed by the section address in the IDAW when the IDAW is accessed for locating data in the large memory, accessing the IDAW list in the located section using the IDAW, and accessing data in the located section using small addresses in the IDAW list.

12. A computer system utilizing small addresses for accessing locations in a large memory, as defined in claim 11, in which the I/O section mode register contains a predetermined value identifying IDAWs as the source containing the section address to be used by small addresses in IDAWs and IDAW lists.

* * * * *